US008772954B1

(12) United States Patent
Barngrover (10) Patent No.: US 8,772,954 B1
(45) Date of Patent: Jul. 8, 2014

(54) POWER BALANCING FOR A DUAL GENERATOR SINGLE DC LINK CONFIGURATION FOR ELECTRIC DRIVE PROPULSION SYSTEM

(71) Applicant: Caterpillar Inc., Peoria, IL (US)

(72) Inventor: Michael Barngrover, Brimfield, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 13/862,559

(22) Filed: Apr. 15, 2013

(51) Int. Cl.
*F02D 29/06* (2006.01)
*F03B 13/10* (2006.01)
*F03B 15/08* (2006.01)
*H02P 9/04* (2006.01)
*F03D 9/00* (2006.01)
*H02P 9/00* (2006.01)

(52) U.S. Cl.
USPC .............. 290/7; 290/40 C; 290/44; 322/44

(58) Field of Classification Search
USPC ................... 290/7, 40 C, 44; 322/44
See application file for complete search history.

(56) References Cited

U.S. PATENT DOCUMENTS

| | | | | |
|---|---|---|---|---|
| 3,571,693 A * | 3/1971 | Riaz | ................ | 322/32 |
| 5,023,537 A * | 6/1991 | Baits | ................ | 318/732 |
| 7,042,110 B2 * | 5/2006 | Mikhail et al. | ................ | 290/44 |
| 7,152,705 B2 | 12/2006 | Alster et al. | ................ | 180/65.245 |
| 7,319,307 B2 | 1/2008 | Wiegman et al. | ................ | 322/14 |
| 7,554,214 B2 * | 6/2009 | Fattal | ................ | 290/40 C |
| 7,573,145 B2 * | 8/2009 | Peterson | ................ | 290/44 |
| 7,598,623 B2 * | 10/2009 | Fattal et al. | ................ | 290/40 F |
| 7,687,929 B2 * | 3/2010 | Fattal | ................ | 290/40 C |
| 7,855,466 B2 * | 12/2010 | Bax et al. | ................ | 290/40 C |
| 7,952,331 B2 * | 5/2011 | Anghel et al. | ................ | 322/29 |
| 7,956,584 B2 * | 6/2011 | Peterson et al. | ................ | 322/44 |
| 7,960,939 B2 * | 6/2011 | Steimer | ................ | 318/803 |
| 7,999,405 B2 * | 8/2011 | Peterson | ................ | 290/40 C |
| 8,525,492 B2 * | 9/2013 | Peterson et al. | ................ | 322/44 |
| 2005/0012339 A1 * | 1/2005 | Mikhail et al. | ................ | 290/44 |
| 2006/0087123 A1 * | 4/2006 | Stout et al. | ................ | 290/2 |

(Continued)

FOREIGN PATENT DOCUMENTS

| | | |
|---|---|---|
| CN | 101494384 A | 7/2009 |
| EP | 0998005 A1 | 5/2000 |

OTHER PUBLICATIONS

Olson, "Paralleling Dissimilar Generators: Part 1—An Overview," White Paper, Technical information from Cummins Power Generation, © 2010 by Cummins Power Generation Inc., 8 pp.

*Primary Examiner* — Pedro J Cuevas
(74) *Attorney, Agent, or Firm* — Leydig, Voit & Mayer (57) ABSTRACT

A machine is described that includes an electric drive for propelling the machine along a ground surface. The machine includes an electric power system having a first generator and a second generator. The electric power system also includes a first rectifier coupled to the first generator and having a first direct current (DC) power output and a second rectifier coupled to the second generator and having a second DC power output. Both the first DC output and the second DC output are coupled to the single DC bus, thereby providing an arrangement for the first rectifier and the second rectifier to simultaneously provide power to the single DC bus. A power balancer control receives power commands from both the first and the second ECMs and issues a corrective voltage adjustment to at least one of the first and second ECMs.

20 Claims, 4 Drawing Sheets

(56) References Cited

U.S. PATENT DOCUMENTS

| | | | |
|---|---|---|---|
| 2007/0007837 A1* | 1/2007 | Mukai et al. | 310/112 |
| 2008/0116695 A1* | 5/2008 | Peterson | 290/40 |
| 2008/0157540 A1* | 7/2008 | Fattal | 290/40 R |
| 2008/0157591 A1* | 7/2008 | Fattal et al. | 307/10.1 |
| 2008/0157594 A1* | 7/2008 | Peterson et al. | 307/10.1 |
| 2009/0302616 A1* | 12/2009 | Peterson | 290/40 B |
| 2010/0137102 A1* | 6/2010 | Sopko et al. | 477/118 |
| 2011/0227408 A1* | 9/2011 | Peterson et al. | 307/9.1 |
| 2012/0297819 A1* | 11/2012 | Becerra et al. | 62/498 |
| 2013/0325271 A1* | 12/2013 | Lister et al. | 701/54 |

\* cited by examiner

POWER BALANCING FOR A DUAL GENERATOR SINGLE DC LINK CONFIGURATION FOR ELECTRIC DRIVE PROPULSION SYSTEM

TECHNICAL FIELD

This patent disclosure relates generally to electrical systems and components within a machine and, more particularly to an electric drive system for a work machine.

BACKGROUND

Direct series electric drive systems for machines typically include a power circuit that selectively activates one or more drive motors at a desired torque. Each of the drive motors is connected to a wheel or other traction device that operates to propel the machine. A direct series drive system also includes a prime mover, for example, an internal combustion engine, that drives a power generator. The power generator produces electrical power that is often conditioned by a power circuit, and ultimately used to drive the motor. Conceptually, as the machine is propelled, mechanical power produced by the engine is converted into electrical power by the generator. This electrical power may be processed and/or conditioned by the power circuit before it is metered to the motors. The motors transform the electrical power back into mechanical power that drives the wheel and propels the machine.

Heavy machinery, such as off-highway truck and wheel loader equipment, is commonly used in mining, heavy construction, quarrying, and other applications. The adoption of electric drive systems has been viewed as improving efficiency and reliability of such machinery. Electric drive systems generally require less maintenance and thus, have lower life cycle costs.

Earlier generations of power systems for driving multiple electric motors relied upon a single generator to supply power to a single power bus. Multiple motors, in turn, are powered via the single power bus. More recently power systems have been proposed wherein multiple generators supply power for powering the multiple motors. Alster et al., U.S. Pat. No. 7,152,705 proposes an electric drive arrangement where generators, driven individually by dual engines, charge a single power storage module. The power bus for a set of electric drive motors, in turn, is powered directly by the power storage module.

Another example of a multiple generator system for driving multiple electric motors divides power supply into a distinct power bus for each generator. In the described embodiment, a first generator provides power to a first power bus connected to a first set of two motors. A second generator provides power to a second power bus connected to a second set of two motors.

Yet another multi-generator system is described in Wiegman et al., U.S. Pat. No. 7,319,307. In this instance, a master bus power control unit measures the total alternating current (AC) output power of multiple synchronous generators connected to a same AC power bus. The master bus power control unit exercises supervisory control over the individual ones of the multiple synchronous generators by issuing correction or adjustment signals to field control units associated with individual ones of the generators. As such, the master bus power control unit uses total power supplied by multiple generators on a single AC power bus to render control decisions and subsequently issue control signals to individual field control units for the generators.

Multiple generator power systems offer advantages over single generator power systems. For example, smaller generators can be used that are potentially less expensive than a single generator providing twice the power. Moreover, a variety of partial failure modes are potentially supported in the event that one of the power sources fails. Such benefits are presented in the examples of known systems mentioned above.

SUMMARY

The disclosure describes, in one aspect, an electric power supply system configured to deliver operating electrical power in a machine having an electric drive system. The electric power supply system delivers operating electrical power in a machine having an electric drive system. The electric power supply system includes a first generator and a second generator, each configured to receive an output provided by a prime mover; a first rectifier coupled to the first generator and having a first direct current (DC) output; a second rectifier coupled to the second generator and having a second DC output; and a single DC bus to which both the first DC output and the second DC output are coupled. The above arrangement enables the first rectifier and the second rectifier to simultaneously provide power to the single DC bus having an operating voltage.

The above system is regulated by a set of programmed processor modules that work in concert to regulate the power supplied to and thus operating voltage of the single DC bus. The system, in this regard, includes a first ECM, including a first regulatory control for maintaining the operating voltage of the single DC bus at a target voltage, the first ECM being configured to: receive a first measured operating voltage of the single DC bus, and generate a first power command for controlling power output by the first rectifier, the first power command being generated by the first regulatory control in accordance with a first error value that is based upon: the target voltage, the first measured operating voltage, and a first voltage adjustment. The system further includes a second ECM, including a second regulatory control for maintaining the operating voltage of the single DC bus at the target voltage, the second ECM being configured to: receive a second measured operating voltage of the single DC bus, and generate a second power command for controlling power output by the second rectifier, the second power command being generated by the second regulatory control in accordance with a second error value that is based at least upon: the target voltage and the second measured operating voltage.

Moreover, the set of regulatory elements for the system further include a power balancer module. The power balancer module is configured to: receive a first value indicative of a level of power output of the first rectifier, receive a second value indicative of a level of power output of the second rectifier, and generate a total voltage adjustment based upon the first value and the second value, and render the first voltage adjustment based upon the total voltage adjustment. The first voltage adjustment is used by the first ECM to counter an imbalance between the power output from the first rectifier and the second rectifier on the single DC bus.

The disclosure further describes both a method for operating the electric power supply system and a computer-readable medium including computer executable instructions for carrying out method.

BRIEF DESCRIPTION OF THE DRAWINGS

While the appended claims set forth the features of the present invention with particularity, the invention and its advantages are best understood from the following detailed description taken in conjunction with the accompanying drawings, of which:

DETAILED DESCRIPTION

This disclosure relates to systems and methods for providing electrical power to electrical components in an electric drive machine or vehicle. The disclosure that follows uses an example of a direct series electric drive system having an engine connected to two generators for producing electrical power delivered via a single power bus that delivers electrical power for consumption by electrical power components, such as electric drive motors of a vehicle. In the exemplary embodiments presented, the generators associated with the machine are multi-phase alternating current (AC) synchronous brushless generators having a rotating input coupled with the output of the engine (prime mover). The generators include a rotating rectifier assembly including three rotating diode pairs, and the generators use a wye (Y) configuration for their windings. The systems and control method described herein, however, also have applicability to other electric drive vehicles. For example, the generators associated with the machine or vehicle could use a delta (Δ) configuration for the windings.

Figure 1:
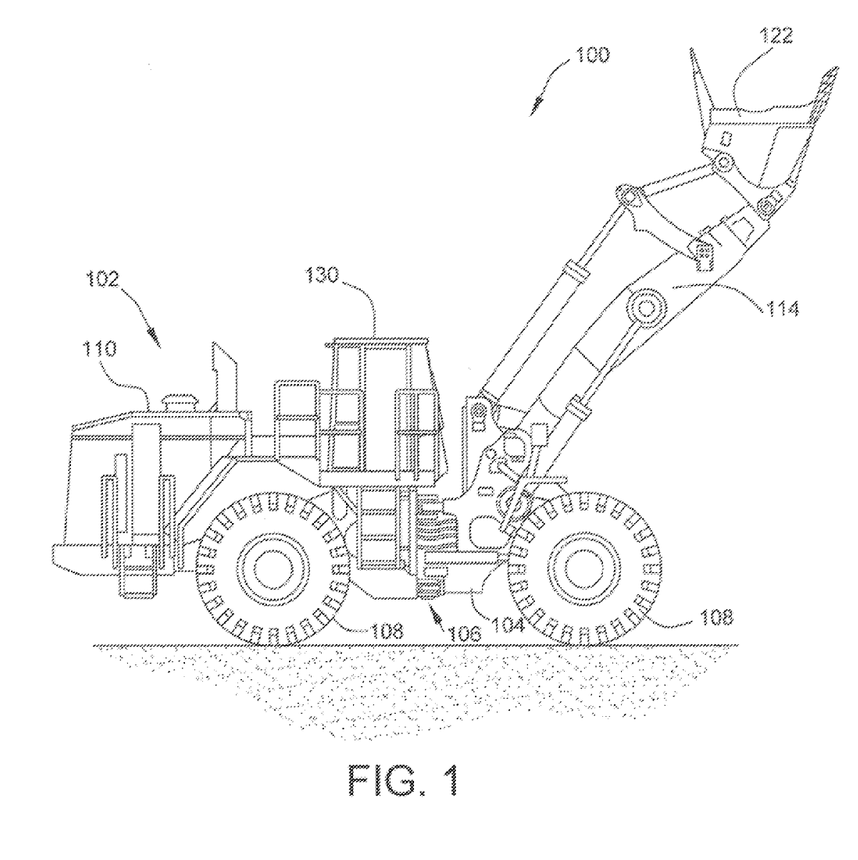
FIG. 1 is a side view of a work machine in accordance with the disclosure.

FIG. 1 illustrates a side view of a machine 100 of which one particular example is a wheel loader (depicted in the figure) such as those used for construction, mining, or quarrying. The machine 100 is a direct series electric drive machine. In the description that follows, this example illustrates the various arrangements that can be used on machines having direct series electric drive systems powered by at least two generators whose output is delivered to a single power bus. As can be appreciated, other vehicles having a direct series electric drive arrangement can benefit from the advantages described herein. The term "machine" generically refers to any machine having at least one drive wheel that is driven by a motor connected to the wheel. Electrical power may be generated onboard by a generator, alternator, or another power-generation device, which may be driven by an engine or other prime mover.

With continued reference to FIG. 1, the machine 100 includes an engine frame portion 102 connected to a non-engine frame portion 104 by an articulated joint 106. The machine 100 includes ground engaging members, in this case, a set of wheels 108. The engine frame portion 102 includes the engine 110. The machine 100 further includes an operator cab 130 that houses various machine control devices. The machine 100 of the illustrated embodiment includes a work implement, which in this case is a bucket 122 connected at the end of a pair of lift arms 114 that are pivotally connected to the non-engine frame portion 104 of the machine 100.

Figure 2A:
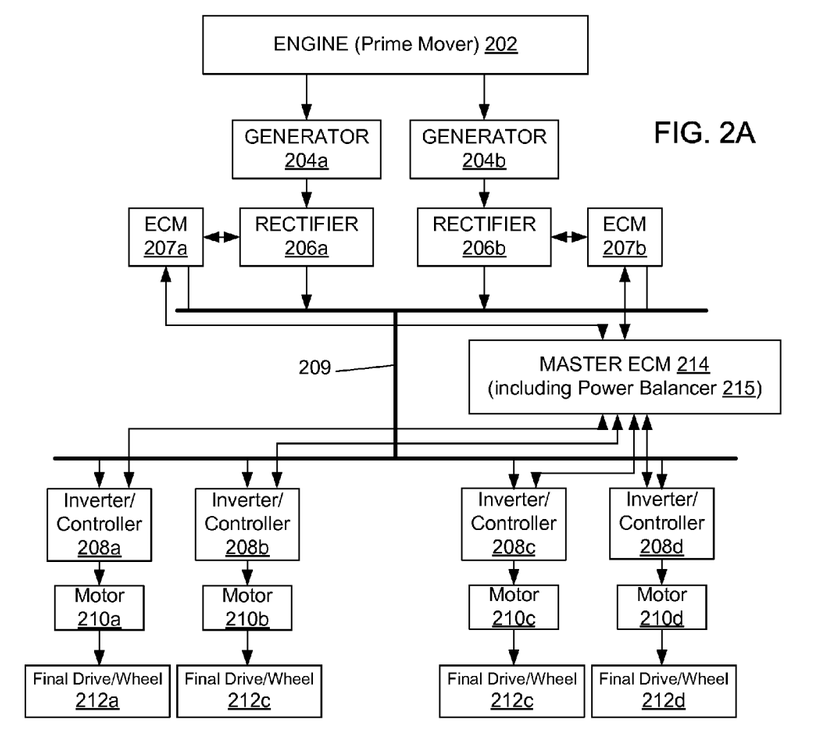
FIG. 2A is a block diagram of a dual generator electric drive system for a work machine in accordance with the disclosure.

The machine 100 (wheel loader) is a direct series electric drive machine, which in this instance refers to the use of more than one source or form of power to drive the wheels 108 of the machine 100. A block diagram for the direct series electric drive system of the machine 100 is shown in FIG. 2A. In the block diagram of FIG. 2A, the flow direction of power (mechanical in the case of the engine/generator and motor/final drive interfaces) in the system when the machine 100 is propelled is denoted by solid-lined arrows. It is noted that the machine 100 can operate in a "retarding" mode wherein motors associated with drive wheels of the machine operate as generators—causing a reverse flow of current from the motors. FIG. 2A also shows connections between a master ECM and a set of control components to ensure proper control of power supply by the components identified in FIG. 2A. More particularly, the master ECM executes a control that: (1) receives, for each one of multiple power supplies for a same DC power bus, a parameter (e.g., power command) indicative of power output by the individual ones of the multiple power supplies on the single DC power bus, and (2) issues signals (e.g., voltage adjustment) to the individual ones of the ECMs controlling the output of respective ones of the multiple power supplies on the DC power bus. The (adjustment) signals issued by the master ECM have the effect of modifying a power level commanded by individual ECMs from respective ones of multiple rectifiers coupled to the single DC power bus to maintain equal power output by the individual ones of the multiple power supplies.

The direct series electric drive system includes an engine 202, for example, an internal combustion engine such as a diesel engine, which produces an output torque at an output shaft (not shown). The output shaft of the engine 202 is connected to individual physical rotational inputs driving respective rotors of a first generator 204a and a second generator 204b. In operation, the output shaft of the engine 202 rotates a rotor of each of the first generator 204a and the second generator 204b to produce electrical power, for example, in the form of alternating current (AC) power. Even though a direct connection is shown between the engine 202 and the generators 204a and 204b, other drive components, such as a transmission or other gear arrangements, may be utilized to couple the output of the engine 202 to the separate rotational inputs driving the respective rotors of the generators 204a and 204b. The generators 204a and 204b may be any appropriate type of generator or alternator known in the power generation art.

The generators 204a and 204b each output three phases of alternating current, with each output having a respective current transducer connected thereto. The AC electrical power of the first generator 204a and the second generator 204b is supplied, respectively to a first rectifier 206a and a second rectifier 206b and converted to direct current (DC) power. In an illustrative example, the first rectifier 206a and the second rectifier 206b may comprise insulated gate bi-polar transistors (IGBTs). An IGBT is a three terminal power semiconductor device that notably combines the desirable operational traits of high efficiency and fast switching of potentially large current. Other types of rectifier circuits may be used for the first rectifier 206a and the second rectifier 206b. It is noted that IGBTs are capable of bi-directional power flow and thus may be operated to perform both A/C to D/C conversion and D/C to AC conversion functions. Thus, the same type of circuit may be used to carry out both rectifier functionality and inverter functionality as discussed herein.

The first rectifier 206a and the second rectifier 206b are directly controlled, respectively, by a first electronic control module (ECM) 207a and a second ECM 207b to produce a particular electrical output on a single DC bus 209. The first ECM 207a and the second ECM 207b execute a feedback-driven (e.g., proportional-integral) control based upon a provided target voltage (controller set point) and a measured (filtered) voltage sensed individually by the first ECM 207a and second ECM 207b on the single DC bus 209. The sensed voltage signal is represented in FIG. 2A by connection lines between the individual ECMs and the single DC bus 209. The functionality of the first ECM 207a and second ECM 207b is described herein below with reference to FIG. 2B. The output from the first rectifier 206a is provided directly to the single DC bus 209, and the output from the second rectifier 206b is provided directly to the single DC bus 209. The single DC bus 209, by way of example, comprises a high voltage rail and low voltage rail—not shown for purposes of avoiding clutter—to which each of the depicted electrical components are connected. In an illustrative example, the first rectifier 206a and the second rectifier 206b deliver a combined power on the single DC bus 209 of up to 500 kW at 650 Volts. It is noted that this is merely an exemplary figure/configuration for power output and other power output values are contemplated in alternative examples.

The rectified DC power on the single DC bus 209 is converted back to AC power by a set of inverter/controllers 208a, 208b, 208c and 208d that are directly coupled to the single DC bus 209. Any known inverter may be used for the arrangement of the inverter/controllers. In one example, the inverter circuit may include three phase arrays of insulated gate bipolar transistors (IGBTs) arranged in transistor pairs and configured to supply a 3-phase AC output to respective drive motors. The inverter/controllers can control the speed of the motors by controlling the frequency and/or the pulse-width of their AC output to the respective motors.

The inverter/controllers 208a, 208b, 208c and 208d are depicted as a single module in FIG. 2A. However, in practice such component is typically provided in the form of an inverter circuit and a separate inverter controller circuit. The inverter/controllers 208a, 208b, 208c and 208d may be capable of selectively adjusting the frequency and/or pulse-width of their respective output to motors 210a, 210b, 210c and 210d. Such adjustments enable each of the motors 210a, 210b, 210c and 210d to operate at independently variable speeds. The motors 210a, 210b, 210c and 210d may be connected via final assemblies (not shown) or directly to respective drive wheels 212a, 212b, 212c and 212d of the machine 100.

In operation, for purposes of efficient use of the mechanical power delivered by the engine 202 to the first generator 204a and the second generator 204b, it is important for the first ECM 207a and the second ECM 207b to control their respective first rectifier 206a and second rectifier 206b to operate at a same commanded power level. Notably, operating at different measured voltage levels (i.e., at least one of the first ECM 207a and the second ECM 207b inaccurately measured the actual voltage of the single DC bus 209) may result in only one of the first rectifier 206a and the second rectifier 206b delivering power to the single DC bus 209 when both the first rectifier 206a and the second rectifier 206b are intended to provide power to the single DC bus 209. Thus, unbalanced power supply by the first rectifier 206a and the second rectifier 206b is potentially caused by the first ECM 207a and the second ECM 207b simultaneously registering differing voltage measurements on the single DC bus 209. A multiple power supply control scheme is described herein that incorporates a voltage adjustment signal (provided to one or both the first ECM 207a and the second ECM 207b) for addressing voltage measurement errors that potentially lead to power supply imbalance.

A master ECM 214 may be incorporated into the overall control framework of the electric drive system to provide supervisory control over the first ECM 207a and the second ECM 207b as well as the inverter/controllers 208a, 208b, 208c and 208d. The master ECM 214 may be configured to operate as a power balancer for the first generator 204a and the second generator 204b in accordance with an active power balancing scheme described herein. The master ECM 214 acquires operational status information from the first ECM 207a and the second ECM 207b to ensure the first rectifier 206a and the second rectifier 206b operate in unison to provide balanced power output to the single DC Bus 209 (i.e., both generators operating in a generator mode—as opposed to one operating in generating mode while the other is operating in a motoring mode wherein power is actually drawn from the single DC bus 209). By way of example, the first ECM 207a and the second ECM 207b each provide, to the master ECM 214, a power level signal indicative of a power command to respective rectifiers 206a and 206b. Based upon the provided power level signals provided by the first ECM 207a and the second ECM 207b, the master ECM 214 may provide a corrective voltage adjustment to one or both of the first ECM 207a and the second ECM 207b.

By way of example, the master ECM 214 includes a power balancer module 215 that executes a regulatory (e.g., integrator) control that generates a total voltage adjustment value based upon a difference between the two power command values received from the first ECM 207a and the second ECM 207b. Other regulatory controls may be used in other arrangements, including, for example, a P-I regulatory control. The total voltage adjustment may thereafter be allocated between individual adjustment voltage adjustment sent to one or both the first ECM 207a and the second ECM 207b. By way of example, the total voltage adjustment generated by the regulatory (e.g., integrator) control of the power balancer module is divided in half, a positive correction adjustment is sent to the ECM 207 that provided the relatively higher power command value (to affect a reduction in the power command), and a negative voltage adjustment value is sent to the ECM 207 that provided the relatively lower power command value (to affect an increase in the power command).

Thus, in the above-summarized control arrangement, the master ECM 214 generates and issues a voltage adjustment to effect a change to the power level commanded by at least one and potentially both of the first ECM 207a and second ECM 207b to affect a balancing of power output by rectifiers 206a and 206b. The master ECM 214 repeatedly performs the operations of receiving the power level (e.g., power command) signals indicative of power commanded by the first ECM 207a and the second ECM 207b from their respective rectifiers, calculating a corrective voltage adjustment, and issuing a voltage adjustment (to one or both the first ECM 207a and the second ECM 207b) to maintain balanced power output from the first rectifier 206a and second rectifier 206b on the single DC bus 209. Finally, while the master ECM 214 is identified as a separate entity in the drawings, in practice the master ECM 214 may be executed as a module within one of the two physically distinct computing elements identified as the first ECM 207a and the second ECM 207b. In contrast to the first ECM and the second ECM, which are indeed two physically distinct circuit elements, the power balancer module 215 (indicated as executing within the master ECM 214) is a logical entity that can reside and execute in any one of various available physical processing elements, including a physical processing element corresponding to one of the first ECM 207a and the second ECM 207b.

Notably, in the above-described power balancing scheme, the master ECM 214 bases computations of the voltage adjustment upon a digital "power command" issued by both the first ECM 207a and the second ECM 207b over a digital data bus (e.g. a well-known controller area network "CAN" bus). As such the master ECM 214 need not filter an input signal representative of the power output of the first rectifier 206a and the second rectifier 206b, respectively. Such filtering would likely be needed in the case of directly measured parameter values. The power balancing voltage adjustment signal is rendered by the master ECM 214 without: (1) measuring the actual individual power output by the first rectifier 206a and the second rectifier 206b, and (2) measuring the actual voltage level of the single DC bus 209.

Alternative schemes for ensuring unified operation of the generators and rectifiers are contemplated as well. In such alternatives the master ECM 214 may indeed base calculations upon analog sensor measurements including ones measuring: torque on the rotational inputs to the first generator 204a and the second generator 204b; output current from the first generator 204a and the second generator 204b; and output current from the first rectifier 206a and the second rectifier 206b. These are merely three examples of several potential sources of signals indicative of power output supplied by each of the first rectifier 206a and the second rectifier 206b on the single DC bus 209.

When the machine 100 is to be decelerated or its motion retarded, for example, to prevent acceleration of the machine 100 when travelling down an incline, the machine 100's kinetic energy is converted to electrical energy. Effective disposition of the generated electrical power enables effective retarding of the machine 100. The retarding aspect of the machine 100's operation is only of secondary importance and will therefore not be discussed further. Instead, the remainder of this description focuses primarily upon the operation of the machine 100 in a propel mode, and more particularly, the operation of the generators 204a and 204b simultaneously providing power (via rectifier 206a and rectifier 206b) to the single DC bus 209 under control of the first ECM 207a and the second ECM 207b that are, in turn, controlled in a supervisory arrangement by the Master ECM 214.

Figure 2B:
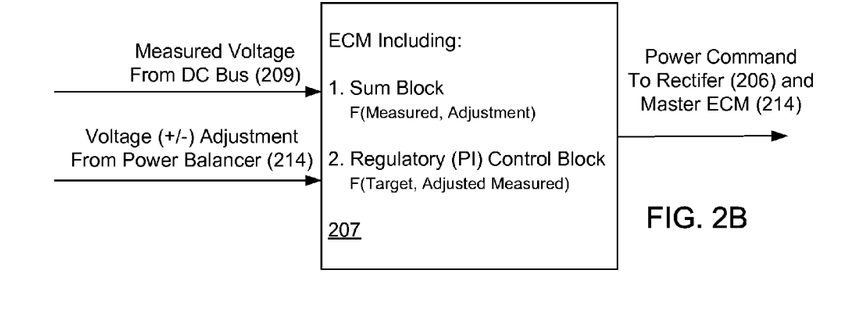
FIG. 2B is a block diagram of an ECM for controlling operation of a rectifier in accordance with a DC power bus feedback signal and an adjustment signal provided by a master controller in accordance with the disclosure.

Turning to FIG. 2B, a block diagram summarizes the exemplary functionality of each of the first ECM 207a and the second ECM 207b (described herein above with reference to FIG. 2A) relating to maintaining equalized power output by the rectifier 206a and the rectifier 206b on the single DC bus 209. With reference to FIG. 2B, the ECM 207 receives inputs in the form of: (1) a measured voltage from the single DC bus 209, and (2) a voltage adjustment from the master ECM 214 operating as a power balancer. A sum block adds the measured voltage from the single DC bus and the voltage adjustment from the master ECM 214 to render an adjusted measured voltage.

The ECM 207 may be configured to execute a regulatory (e.g. proportional-integral) control block based upon a voltage error. The voltage error signal driving the regulatory control block is based upon a difference between: (1) a previously designated target (set point) voltage for the single DC power bus (e.g., 650 volts), and (2) the adjusted measured voltage. The voltage error is used by the regulatory control block of the ECM 207 to render an updated power command to a respective rectifier (e.g., first rectifier 206a). Thus, the ECM 207 (see e.g., first ECM 207a in FIG. 2A) executes a feedback-driven (e.g., proportional-integral) control for rendering a power command output signal to a rectifier 206 (e.g., first rectifier 206a in FIG. 2A) providing power to the single DC bus 209. As such voltage measurement errors by the ECM 207 providing the power command to the rectifier 206 are corrected via voltage adjustments provided by the master ECM 214 to the ECM 207 (e.g., first ECM 207a).

Figure 3:
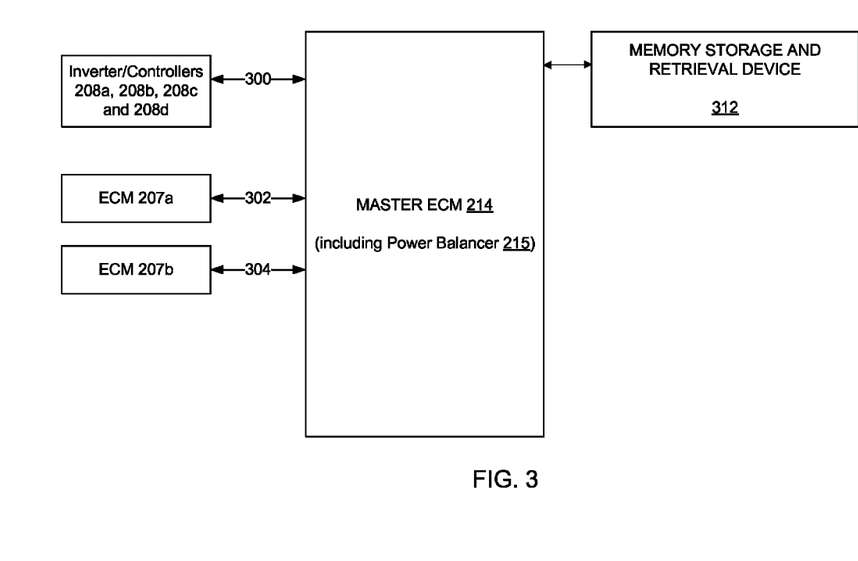
FIG. 3 is a block diagram illustrating various connections between a master controller and various control components of an electric drive system in accordance with the disclosure.

A block diagram for the master ECM 214 for use in the drive system of an electric drive machine is shown in FIG. 3. The master ECM 214 may be a single controller or may include more than one controller disposed to control various functions and/or features of a machine. For example, a master controller, used to control the overall operation and function of the machine, may be cooperatively implemented with a motor or engine controller, used to control the engine 202. In this embodiment, the term "controller" is meant to include one, two, or more controllers that may be associated with the machine 100 and that may cooperate in controlling various functions and operations of the machine 100. The functionality of the controller may be implemented in hardware and/or software without regard to the discrete functionality. Accordingly, various interfaces of the master ECM 214 are described relative to components of the drive system shown in the block diagram of FIG. 2A. Such interfaces are not intended to limit the type and number of components that are connected, nor the number of controllers that are described.

With continued reference to FIG. 3, the master ECM 214 may operate in a logical fashion to perform operations, execute control algorithms, store and retrieve data, and so forth. In this embodiment, the master ECM 214 may access a memory storage and retrieval device 312 that contains, for example, one or more tables (or other appropriate data organization) containing addressable elements of data. The memory storage and retrieval device 312 may be in the form of read only memory (ROM) or random access memory (RAM) or integrated circuitry that is accessible by the master ECM 214, or integrated therewith.

In addition to its function of controlling various components and/or systems of the machine 100, the master ECM 214 may further be disposed to diagnose fault conditions of various components and systems. More specifically, the master ECM 214 may continuously monitor various operating parameters of the machine 100, compare them to a reference value, and diagnose failures or fault conditions in various systems of the machine (e.g., a power output imbalance between the respective outputs of the first rectifier 206a and the second rectifier 206b) when the monitored parameters, or sets of parameters, diverge from expected values. In one embodiment, the master ECM 214 may perform diagnostic operations when the machine is first started, or idle, such that various operating parameters are repeatable and stable. For example, various diagnostic operations may be performed when the electric drive system of the machine is operating and in an idle condition. An idle condition is meant to encompass any operating mode of the machine during which generator is operating but there is no power or very little electrical power being consumed. In such a condition, fault conditions may be detected by the master ECM 214 and stored within the memory storage and retrieval device 312 for later retrieval and inspection by service personnel. These fault indications may be in the form of single bit data elements that, for example, are set at a zero value when no fault has been detected, and changed to a value of one when a fault has been detected. Other data values or variable types may also be used.

The master ECM 214 is disposed to transmit control signals and receive status signals from each of the inverter controllers 208a, 208b, 208c and 208d via lines 300. Such signals are used, for example, to regulate the speed of the corresponding motors 210a, 210b, 210c and 210d.

In FIG. 3, the master ECM 214 is further disposed to receive operational status signals (e.g., power command output from the ECMs 207) via lines 302 and 304 from the first ECM 207a and the second ECM 207b. Such signals include at least a power command (e.g., current, torque, etc.) issued by each of the first ECM 207a and the second ECM 207b to the respective first rectifier 206a and the second rectifier 206b. The master ECM 214 is also configured with the power balancer module 215 (described herein above with reference to FIG. 2) to provide a voltage adjustment signal via lines 302 and 304 to the first ECM 207a and the second ECM 207b to correct a potential error in the one or more DC bus voltage measurements used by the first ECM 207a and the second ECM 207b to render power commands to the respective first rectifier 206a and the second rectifier 206b to prevent a potential imbalance between the operating states of the first generator 204a and the second generator 204b. The potential power imbalance prevention scheme is discussed below with reference to FIG. 4.

Figure 4:
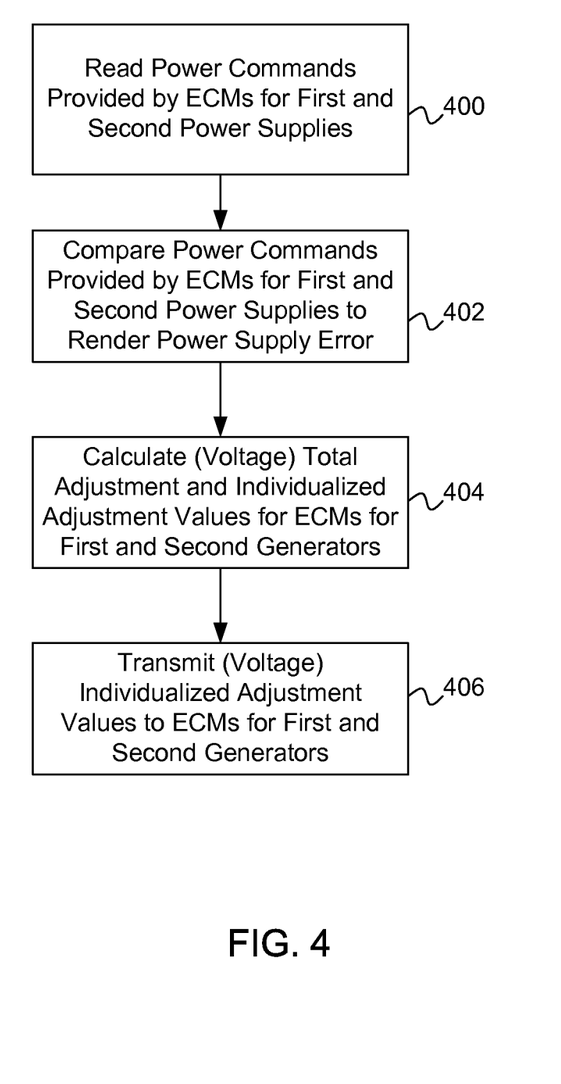
FIG. 4 is a flowchart for a method for controlling operation of multiple individual power supplies on a single DC power bus by monitoring operating parameters associated with individual ones of the multiple individual power supplies of the electric drive system in accordance with the disclosure.

FIG. 4 is a flowchart for a method of monitoring and maintaining balanced power output by the first generator 204a and the second generator 204b during operation of the machine 100. During step 400 the master ECM 214 receives power commands from the first ECM 207a and the second 207b for the first rectifier 206a and the second rectifier 206b supplying power for the single DC bus 209. The power commands are representative of the power provided by the respective first rectifier 206a and the second rectifier 206b. Thereafter, the power balancer module 215 executes in the master ECM 214 to ensure balanced operation (power supply) of both the first generator 204a and the second generator 204b. In particular, at step 402 the power balancer module 215 compares the power commands provided by the ECM 207a and the second ECM 207b for the first generator 204a and the second generator 204b, respectively to render a power supply error value.

During step 404, based upon the power supply error value rendered during step 402, the power balancer module 215 executes a regulatory control (integrator) cycle to render a total (voltage) adjustment value, and the power balancer module 215 thereafter calculates individualized adjustment values for transmission to the first ECM 207a and the second ECM 207b. The individualized adjustment values have the intended effect of increasing/decreasing a power command issued by the receiving first ECM 207a and second ECM 207b to the respective first rectifier 206a and second rectifier 206b to restore power output balance.

Thereafter, during step 406 the master ECM 214 transmits the individualized adjustment values (e.g., voltage adjustment values) to the first ECM 207a and the second ECM 207b to affect a balancing of power output by the first rectifier 206a and the second rectifier 206b. In an exemplary embodiment, the above sequence of steps is performed every 20 milliseconds to ensure good response characteristics to a relatively slow changing power supply condition.

INDUSTRIAL APPLICABILITY

The industrial applicability of the system described herein should be readily appreciated from the foregoing discussion. The present disclosure may be included as part of an electrical power drive system for a work machine such as an off-road machine of which a wheel loader is a particular example.

Off-highway work machines, particularly those adapted to use electric, hybrid, or direct series electric drive systems, may require large power generation capabilities that necessitate use of multiple generators. Moreover, dual-generators may be needed to provide a level of redundancy for ensuring the ability of a work machine to operate in a degraded operation mode in the event one of the generators is rendered inoperative.

The systems described above can be adapted to a large variety of machines and tasks. For example, other types of industrial machines, such as backhoe loaders, compactors, feller bunchers, forest machines, industrial loaders, skid steer loaders, wheel loaders and many other machines can benefit from the system described.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. An electric power supply system configured to deliver operating electrical power in a machine having an electric drive system, the electric power supply system comprising:
    a first generator and a second generator, each configured to receive an output provided by a prime mover;
    a first rectifier coupled to the first generator and having a first direct current (DC) output;
    a second rectifier coupled to the second generator and having a second DC output;
    a single DC bus to which both the first DC output and the second DC output are coupled, thereby providing an arrangement for the first rectifier and the second rectifier to simultaneously provide power to the single DC bus wherein the single DC bus has an operating voltage;
    a first ECM, including a first regulatory control for maintaining the operating voltage of the single DC bus at a target voltage, the first ECM being configured to:
        receive a first measured operating voltage of the single DC bus, and
        generate a first power command for controlling power output by the first rectifier, the first power command being generated by the first regulatory control in accordance with a first error value that is based upon: the target voltage, the first measured operating voltage, and a first voltage adjustment;

a second ECM, including a second regulatory control for maintaining the operating voltage of the single DC bus at the target voltage, the second ECM being configured to:
receive a second measured operating voltage of the single DC bus, and
generate a second power command for controlling power output by the second rectifier, the second power command being generated by the second regulatory control in accordance with a second error value that is based at least upon: the target voltage and the second measured operating voltage;
a power balancer module configured to:
receive a first value indicative of a level of power output of the first rectifier,
receive a second value indicative of a level of power output of the second rectifier, and
generate a total voltage adjustment based upon the first value and the second value, and render the first voltage adjustment based upon the total voltage adjustment, the first voltage adjustment being used by the first ECM to counter an imbalance between the power output from the first rectifier and the second rectifier on the single DC bus.

2. The electric power supply system of claim 1:
wherein the second error value is further based upon a second voltage adjustment, and
wherein a sum of a magnitude of the first voltage adjustment and a magnitude of the second voltage adjustment equals a magnitude of the total voltage adjustment.

3. The electric power supply system of claim 2 wherein the magnitudes of the first voltage adjustment and the second voltage adjustment are equal.

4. The electric power supply system of claim 1 wherein the first error value is generated based upon a difference between the target voltage and a first adjusted voltage, wherein the first adjusted voltage is a sum of the first measured operating voltage and the first voltage adjustment.

5. The electric power supply system of claim 1 further comprising:
a master ECM; and
a digital data communication channel between the master ECM and each of the first ECM and the second ECM facilitating receiving, by the master ECM, the first value and the second value,
wherein the power balancer module executes within the master ECM.

6. The electric power supply system of claim 1 wherein the first value corresponds to the first power command issued by the first ECM and the second value corresponds to the second power command issued by the second ECM.

7. The electric power supply system of claim 1 wherein the first value is based upon an output from the first generator and the second value is based upon an output from the second generator.

8. The electric power supply system of claim 1 wherein the first regulatory control and second regulatory control each execute proportional-integral control functions.

9. The electric power supply system of claim 1 wherein the total voltage adjustment is based upon a difference between the first value and the second value, and wherein the first value corresponds to the first power command and the second value corresponds to the second power command.

10. The electric power supply system of claim 1 further comprising a first inverter/controller coupled to the single DC bus and configured to provide a controlled alternating current to a first motor driving a final drive of the machine.

11. A method for controlling electric power supply, in a system configured to deliver operating electrical power in a machine having an electric drive system that includes:
a first generator and a second generator, each configured to receive an output provided by a prime mover;
a first rectifier coupled to the first generator and having a first direct current (DC) output;
a second rectifier coupled to the second generator and having a second DC output;
a single DC bus to which both the first DC output and the second DC output are coupled, thereby providing an arrangement for the first rectifier and the second rectifier to simultaneously provide power to the single DC bus wherein the single DC bus has an operating voltage;
wherein the method for controlling electric power supply comprises:
maintaining, by a first ECM including a first regulatory control, the operating voltage of the single DC bus at a target voltage, the maintaining including:
receiving a first measured operating voltage of the single DC bus, and
generating a first power command for controlling power output by the first rectifier, the first power command being generated by the first regulatory control in accordance with a first error value that is based upon: the target voltage, the first measured operating voltage, and a first voltage adjustment;
maintaining, by a second ECM including a second regulatory control, the operating voltage of the single DC bus at the target voltage, the maintaining including:
receiving a second measured operating voltage of the single DC bus, and
generating a second power command for controlling power output by the second rectifier, the second power command being generated by the second regulatory control in accordance with a second error value that is based at least upon: the target voltage and the second measured operating voltage;
providing, by a power balancer module, the first voltage adjustment, the first voltage adjustment being used by the first ECM to counter an imbalance between the power output from the first rectifier and the second rectifier on the single DC bus, the providing including:
receiving a first value indicative of a level of power output of the first rectifier,
receiving a second value indicative of a level of power output of the second rectifier, and
generating a total voltage adjustment based upon the first value and the second value, and rendering the first voltage adjustment based upon the total voltage adjustment.

12. The method of claim 11 further comprising rendering a second voltage adjustment during the providing,
wherein the second error value is further based upon the second voltage adjustment, and
wherein a sum of a magnitude of the first voltage adjustment and a magnitude of the second voltage adjustment equals a magnitude of the total voltage adjustment.

13. The method of claim 12 wherein the magnitudes of the first voltage adjustment and the second voltage adjustment are equal.

14. The method of claim 11 wherein the first error value is generated based upon a difference between the target voltage and a first adjusted voltage, wherein the first adjusted voltage is a sum of the first measured operating voltage and the first voltage adjustment.

15. The method of claim 11 wherein the first value corresponds to the first power command issued by the first ECM and the second value corresponds to the second power command issued by the second ECM.

16. The method of claim 11 wherein the first value is based upon an output from the first generator and the second value is based upon an output from the second generator.

17. The method of claim 11 wherein the first regulatory control and second regulatory control each execute proportional-integral control functions.

18. The method of claim 11 wherein the total voltage adjustment is based upon a difference between the first value and the second value, and wherein the first value corresponds to the first power command and the second value corresponds to the second power command.

19. The method of claim 11 further comprising a first inverter/controller coupled to the single DC bus and configured to provide a controlled alternating current to a first motor driving a final drive of the machine.

20. A non-transitory computer-readable medium including computer-executable instructions for controlling electric power supply, in a system configured to deliver operating electrical power in a machine having an electric drive system that includes:
- a first generator and a second generator, each configured to receive an output provided by a prime mover;
- a first rectifier coupled to the first generator and having a first direct current (DC) output;
- a second rectifier coupled to the second generator and having a second DC output;
- a single DC bus to which both the first DC output and the second DC output are coupled, thereby providing an arrangement for the first rectifier and the second rectifier to simultaneously provide power to the single DC bus wherein the single DC bus has an operating voltage;
- wherein the computer-executable instructions facilitate performing a method, for controlling electric power supply in the electric drive system, comprising:

maintaining, by a first ECM including a first regulatory control, the operating voltage of the single DC bus at a target voltage, the maintaining including:
- receiving a first measured operating voltage of the single DC bus, and
- generating a first power command for controlling power output by the first rectifier, the first power command being generated by the first regulatory control in accordance with a first error value that is based upon: the target voltage, the first measured operating voltage, and a first voltage adjustment;

maintaining, by a second ECM including a second regulatory control, the operating voltage of the single DC bus at the target voltage, the maintaining including:
- receiving a second measured operating voltage of the single DC bus, and
- generating a second power command for controlling power output by the second rectifier, the second power command being generated by the second regulatory control in accordance with a second error value that is based at least upon: the target voltage and the second measured operating voltage;

providing, by a power balancer module, the first voltage adjustment, the first voltage adjustment being used by the first ECM to counter an imbalance between the power output from the first rectifier and the second rectifier on the single DC bus, the providing including:
- receiving a first value indicative of a level of power output of the first rectifier,
- receiving a second value indicative of a level of power output of the second rectifier, and
- generating a total voltage adjustment based upon the first value and the second value, and rendering the first voltage adjustment based upon the total voltage adjustment.

* * * * *